W. H. McNUTT.
SAFETY CASING FOR OIL OR GAS HEATERS.
APPLICATION FILED OCT. 25, 1917.
1,255,033.
Patented Jan. 29, 1918.
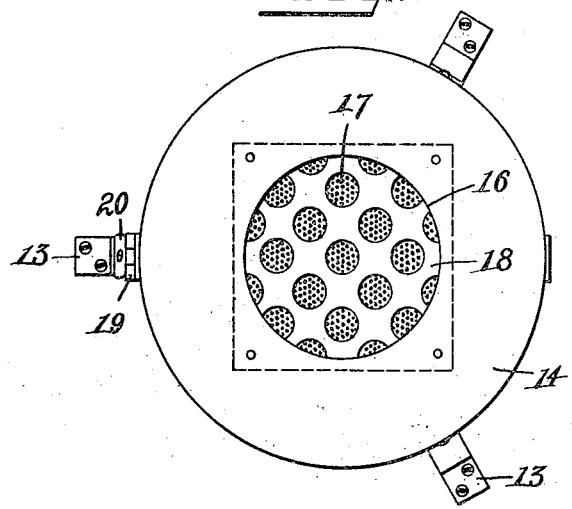
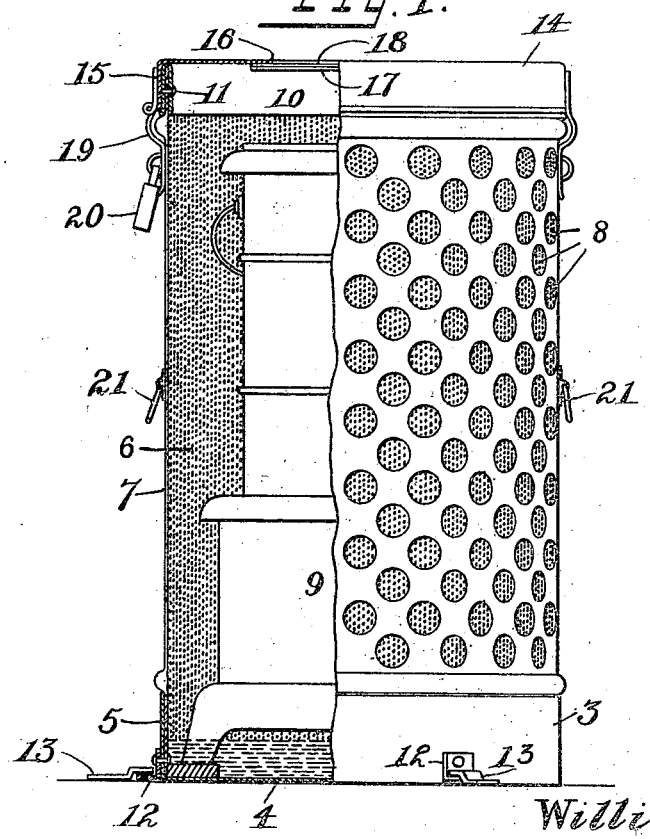
Inventor:
William H. McNutt
By Wm. H. Reid. atty

UNITED STATES PATENT OFFICE.

WILLIAM H. McNUTT, OF NEW YORK, N. Y., ASSIGNOR TO McNUTT CAN SALES CO., OF NEW YORK, N. Y., A CORPORATION OF NEW YORK.

SAFETY-CASING FOR OIL OR GAS HEATERS.

1,255,033.     Specification of Letters Patent.     Patented Jan. 29, 1918.

Application filed October 25, 1917. Serial No. 198,393.

*To all whom it may concern:*

Be it known that I, WILLIAM H. McNUTT, a citizen of the United States, residing at New York, in the county and State of New York, have invented certain new and useful Improvements in Safety-Casings for Oil or Gas Heaters, of which the following is a specification.

The object of the present invention is to provide a casing or container for a heater or heating stove of the kind that usually burns kerosene, that will prevent the escape of flame through the casing from the inside, and that might cause explosion or a conflagration, especially in rooms or buildings where the vapors and fumes of hydro-carbon liquids are liable to escape. A further object of the invention is to provide such a device that will absorb the unpleasant vapors or smoke.

In the accompanying drawing showing one embodiment of my invention, Figure 1 is a front elevation, partly in section of the device; and Fig. 2 is a plan view.

The casing as set forth in the drawing comprises essentially a bottom member in the nature of a fluid-tight container or pan, from which a double walled side member extends upwardly, of a cylindrical shape, and which walls are of perforated flame-proof material, and are secured to a ring at the top; which casing is closed by a suitable cover that preferably is provided also with flame proof openings. As shown, I provide a bottom or pan member 3 having the bottom 4 flat and the side 5 cylindrical. The side wall of the vessel is formed of an inner cylindrical member 6, and an outer cylindrical member 7 that are in close proximity and which extend down into the pan 3 to engage the inner wall of its side member 5. The inner wall 6 is formed of flame-proof sheet metal, and is shown as perforated, and may be provided with minute openings about two hundred to the square inch. The outer wall is shown as of sheet metal containing comparatively large openings 8, of about three quarters of an inch in diameter. These large openings expose the inner perforated wall, and permit the radiation of the heat from the heater 9 that is placed in the casing.

At their upper ends the walls 6 and 7 are secured to a ring member 10, preferably made U-shape in section with the edges at the lower portion, between the walls of which the upper ends of the walls 6 and 7 are secured, as by rivets 11. At the lower end these walls are riveted to the side 5 of the pan, and a holding bracket 12 of angular form may be secured thereto by suitable rivets as shown. This bracket has a flat base extending outwardly, adapted to coöperate with a floor plate 13 having an offset portion under which the bracket 12 may be inserted by a circular movement, whereby the casing can be temporarily secured to a floor, to prevent its being overturned.

The pan 3 is made fluid tight, so that water may be poured into the pan below the stove. The casing being covered, this water will tend to absorb the gases and smoke given off by the heater, and thus prevent their escape into the room. The water will also generate a certain amount of aqueous vapor, which will escape with the heat from the stove and tend to prevent the usual dry atmosphere where such heaters are employed.

I provide a suitable cover for the casing, preferably of heavy sheet metal comprising a flat top 14 and a cylindrical side wall 15, which member fits snugly on top of the casing and engages the ring member 10. The top of the cover is preferably made open to permit escape of the heat effect. As shown, I provide a large circular opening 16, that is closed by a pair of plates 17 and 18. The plate 17 is of finely perforated sheet metal similar to the wall 6, while the upper plate 18 is provided with numerous large openings similar to the wall 7. These two plates are riveted or otherwise secured to the inner wall of the top of the cover as shown. If desired the cover may be locked in position by a suitable hasp 19, and padlock 20 to prevent removal of the heater.

A device of this character is very economical to construct, comprising merely the pan which may be a stamping, the two cylindrical perforated metal side walls riveted to the pan, and the top ring member riveted to the side walls; in combination with a suitable cover that may be a stamping, with an opening covered by the flame proof sheet metal. The use of this device will permit the heater to perform its usual function of warming the room, yet will absolutely prevent fumes of inflammable vapor from passing into the casing to the heater to be exploded, and will also prevent any flame from the heater from passing out into the room to explode gas or vapor therein. In addition to this safety feature, the water in the pan will absorb noxious vapors emanating from the heater. The casing can be readily secured to the floor to prevent danger from its being overturned; at the same time the casing may be carried from place to place if desired, and suitable handles 21 may be provided for this purpose.

Having thus described my invention, what I claim is:—

1. A safety casing for a kerosene burning heater, comprising a bottom member in the form of a fluid-tight pan having a comparatively short side wall, a pair of adjacent cylindrical side walls extending up from the inner wall of said pan and rigidly secured together thereto, a ring of sheet metal of substantially U-shape in section at the top of said two walls inclosing their upper edges and securely fastened thereto, said inner wall being of finely perforated flame-proof sheet metal, and the outer wall having numerous comparatively large openings, and a removable cover for the casing.

2. A safety casing for a kerosene burning heater, comprising a bottom member in the form of a fluid-tight pan having a comparatively short side wall, a pair of adjacent cylindrical side walls extending up from the inner wall of said pan and rigidly secured together thereto, a ring of sheet metal of substantially U-shape in section at the top of said two walls inclosing their upper edges and securely fastened thereto, said inner wall being of finely perforated flame-proof sheet metal, and the outer wall having numerous comparatively large openings, and a removable cover for the casing of heavy sheet metal having a rim arranged to fit tightly on top of said casing, the cover being provided with a central opening in which is secured a pair of apertured plates, the upper plate having numerous large openings and the adjacent lower plate being of finely perforated flame-proof sheet metal.

3. A safety casing for a kerosene burning heater, comprising a bottom member in the form of a fluid-tight pan having a comparatively short side wall, a pair of adjacent cylindrical side walls extending up from the inner wall of said pan and rigidly secured together thereto, a ring of sheet metal at the top of said two walls securely fastened thereto, said inner wall being of finely perforated flame-proof sheet metal, and the outer wall having numerous comparatively large openings, and a removable cover for the casing.

WILLIAM H. McNUTT.

Copies of this patent may be obtained for five cents each, by addressing the "Commissioner of Patents, Washington, D. C."